(12) United States Patent
Lee et al.

(10) Patent No.: US 7,477,619 B2
(45) Date of Patent: Jan. 13, 2009

(54) METHOD AND APPARATUS FOR SELECTING MBMS RADIO BEARER TYPE

(75) Inventors: Young Dae Lee, Kyoungki-do (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 658 days.

(21) Appl. No.: 10/924,093

(22) Filed: Aug. 19, 2004

(65) Prior Publication Data

US 2005/0041610 A1 Feb. 24, 2005

(30) Foreign Application Priority Data

Aug. 19, 2003 (KR) .................... 10-2003-0057388

(51) Int. Cl.
*H04Q 7/00* (2006.01)
*H04L 12/28* (2006.01)
*H04J 3/26* (2006.01)
(52) U.S. Cl. .................. 370/328; 370/329; 370/390; 370/432; 370/477; 370/312
(58) Field of Classification Search .......... 370/328, 370/329, 370, 390, 432, 477, 312, 331, 338, 370/431
See application file for complete search history.

(56) References Cited

U.S. PATENT DOCUMENTS

| | | | | |
|---|---|---|---|---|
| 2004/0032877 | A1* | 2/2004 | Chuah et al. | 370/444 |
| 2004/0103435 | A1* | 5/2004 | Yi et al. | 725/81 |
| 2004/0127243 | A1* | 7/2004 | Sarkkinen | 455/511 |
| 2004/0157640 | A1* | 8/2004 | Pirskanen et al. | 455/552.1 |
| 2004/0185837 | A1* | 9/2004 | Kim et al. | 455/414.3 |
| 2005/0015583 | A1* | 1/2005 | Sarkkinen et al. | 713/150 |
| 2005/0030966 | A1* | 2/2005 | Cai et al. | 370/432 |
| 2005/0118992 | A1* | 6/2005 | Jeong et al. | 455/422.1 |
| 2006/0166653 | A1* | 7/2006 | Xu et al. | 455/412.2 |

FOREIGN PATENT DOCUMENTS

CN 1536795 10/2004

OTHER PUBLICATIONS

3GPP: "3rd Generation Partnership Project; Technical Specification Group Radio Access Network; Introduction of Multimedia Broadcast Multicast Service (MBMS) in the Radio Access Network (Stage 2); (Release 6)". 3GPP TS 25.346 V2.0.0, [online] Jun. 2003 [retrieved on Nov. 24, 2004], p. 8, paragraph 5.1.4.
Nokia: "MBMS Signalling Flows for UEs in Idle mode" TSG-RAN WG2 meeting #33, R2-022998, [online] Nov. 15, 2002 [retrieved on Nov. 24, 2004], the whole document.
Vodafone Group: "Mechanism for counting and re-counting MBMS users in idle/URA_PCH-like states"3GPP TSG-RAN2/3 Joint MBMS Meeting #1, Tdoc R2-030063, [online] Jan. 16, 2003 [retrieved on Nov. 24, 2004], the whole document.

* cited by examiner

*Primary Examiner*—Vincent P Harper
*Assistant Examiner*—Marisol Figueroa
(74) *Attorney, Agent, or Firm*—Lee, Hong, Degerman, Kang & Waimey

(57) ABSTRACT

A method and apparatus for selecting a radio bearer type for providing a service to a plurality of mobile terminals according to a count of mobile terminals obtained through responses to a service response request message from a network is provided. An MBMS radio bearer type is selected according to a count that includes RRC-connected mobile terminals that still need to establish a connection in order to receive an MBMS such that the radio bearer type established is sufficient to provide the MBMS to all mobile terminals desiring to receive the service.

25 Claims, 7 Drawing Sheets

METHOD AND APPARATUS FOR SELECTING MBMS RADIO BEARER TYPE

CROSS-REFERENCE TO RELATED APPLICATIONS

This application claims the benefit of Korean Application No. 10-2003-057388 filed on Aug. 19, 2003, which is hereby incorporated by reference.

BACKGROUND OF THE INVENTION

1. Field of the Invention

The present invention relates to a method and apparatus for providing a service, such as a multimedia broadcast/multicast service (MBMS), in a universal mobile telecommunications system (UMTS), and more particularly, to a method and apparatus for selecting a radio bearer type according to a count of mobile terminals obtained through responses to a service response request message from a network.

2. Discussion of the Related Art

The universal mobile telecommunications system (UMTS) is a third-generation mobile communications system evolving from the global system for mobile communications system, which is the European standard. The UMTS is aimed at providing enhanced mobile communications services based on the GSM core network and wideband code-division multiple-access technologies.

A conventional UMTS network structure 1 is illustrated in FIG. 1. One mobile terminal 2, or user equipment (UE), is connected to a core network 4 through a UMTS terrestrial radio access network (UTRAN) 6. The UTRAN 6 configures, maintains, and manages a radio access bearer for communications between the UE 2 and core network 4 to meet end-to-end quality-of-service requirements.

The UTRAN 6 consists of at least one radio network subsystem 8, including one RNC 10 acting as an access point to the core network, and at least one Node B 12 managed by a corresponding RNC. The RNCs 10 are logically classified as controlling RNCs, which allocate and manage common radio resources for a plurality of UEs 2 of a cell, and serving RNCs, which allocate and manage dedicated radio resources for a specific UE of a cell. Each Node B 12 manages at least one cell.

The core 4 network may be divided according to the type of service provided, namely, a circuit-switched (CS) domain and a packet-switched (PS) domain. The CS domain includes a mobile switching center (MSC) 14 acting as an access point to the UTRAN 6 and a gateway mobile switching center (GMSC) 16 acting as an access point to an external network. The PS domain includes a serving GPRS support node (SGSN) 18 acting as an access point to the UTRAN 6 and a gateway GPRS support node (GGSN) 20 acting as an access point to the external network.

In the CS domain, the core network's 4 access point is the MSC 14 via an Iu-CS interface. In the PS domain, the core network's 4 access point is the SGSN 18 via an Iu-PS interface. A visitor location register (VLR) 22 and a home location register (HLR) 24 manage user registration information.

The air interface (Uu) between the UE 2 and the UTRAN 6 includes a radio resource control (RRC) layer (not shown) for the establishment, reconfiguration, and release of radio bearers, for example a service providing data transfer between the UE and an RNC 10 of the UTRAN. A UE 2 is said to be in the RRC-connected mode when the RRC layer of a UE and the RRC layer of a corresponding RNC 10 are connected, thereby providing for bi-directional transfer of RRC messages. If there is no RRC connection, the UE 2 is said to be in the RRC-idle mode.

The serving RNC 10 of an RRC-connected UE 2 recognizes and manages the UE by cells. An RRC-idle UE 2, on the other hand, cannot be recognized by cells and can be considered invisible to the RNC 10. Therefore, the MSC 14 or SGSN 18 of the core network 4 manages RRC-idle UEs 2 using larger areas, such as location units or routing area units.

Upon power-up, a UE 2 is in the RRC-idle mode by default. When necessary, an RRC-idle UE 2 transitions to the RRC-connected mode through an RRC connection procedure.

An RRC connection is established, for example, when uplink data transfer is needed to make a call or to respond to a paging message from the RNC 10. The RRC connection connects the UE 2 to the RNC 10 of the UTRAN 6. However, in order to receive a service, for example MBMS, the UE must be connected to the core network 4 (MSC 14 or SGSN 18). Connection of the UE 2 to the core network 4 for control of the service is achieved by a "signaling connection," either a CS connection or PS connection according to the type of service.

A CS connection, which is established between the UE 2 and MSC 14, consists of an RRC connection and an Iu-CS connection. When there is a CS connection, the UE2 is said to be in the circuit mobility management (CMM) connected, or CMM-connected, mode. When there is no such connection, the UE 2 is said to be in the CMM-idle mode.

A PS connection, which is established between the UE 2 and SGSN 18, consists of an RRC connection and an Iu-PS connection. When there is a PS connection, the UE 2 is said to be in the packet mobility management (PMM) connected, or PMM-connected, mode. When there is no such connection, the UE 2 is said to be in the PMM-idle mode.

One UE 2 may have two signaling connections, for example both a CS connection and a PS connection, but only one RRC connection. An RRC-connected UE 2 may have no signaling connection, whereby the UE is managed by the RNC 10 only and cannot receive services.

To join a specific MBMS, both an RRC connection and an Iu-PS connection, or a PS connection, is required through which a UE 2 is connected to the SGSN 18. An MBMS-joined UE 2 remains in the RRC-connected mode by maintaining the PS connection. Upon termination of the service, the UE 2 transitions to the RRC-idle mode by severing the PS connection.

When MBMS data transfer is eminent and a UE2 is standing by, for example intending to receive data of the MBMS, the SGSN 18 sends a "session start" message to the RNC 10. The RNC 10 transmits an MBMS notification message to the UE 2 at least once before the MBMS data is transferred.

The MBMS notification message is transmitted via a combination of common logical and transport channels. At the time of MBMS notification, the RNC 10 recognizes, or counts, the number of UEs 2 joining the MBMS within a cell. The counted number of UEs 2 determines whether a radio bearer will be established for providing a specific MBMS, and if so, whether the established radio bearer will be a point-to-multipoint (p-t-m) type or a point-to-point (p-t-p) type. Proper establishment of a radio bearer ensures efficient utilization of radio resources.

FIG. 2 illustrates a conventional connection of a plurality of UEs 2 to a core network 4 providing an MBMS. The RNC 10 first receives information from the SGSN 18 to determine the number of UEs 2 intending to receive the MBMS. Recognizing the presence of UEs 2 that join the MBMS and remain in the RRC-connected mode due to another service, the SGSN 18 provides the RNC 10 with information regarding PMM-connected UEs 2.

Specifically, the SGSN 18 provides "initial" UE 2 identification information, such as an intrinsic identifier or ID assigned to each UE, and the MBMS identification, or service ID information, of the specific service that the UE is joining. The RNC 10 stores the initial UE IDs of the UEs 2 joining the MBMS and thereby counts the number of RRC-connected UEs among a plurality of UEs joining the MBMS.

The initial UE ID enables the identification of a UE 2 regardless of its RRC connection status, thereby enabling identification of UEs by a core network 4 entity such as the MSC 14 or SGSN 18. The initial UE ID may be an international mobile subscriber identity (IMSI) enabling a subscriber's identification worldwide, a temporary mobile subscriber identity (TMSI) allocated by the MSC 14 to a UE 2 having a CS connection for security of the IMSI, or a packet TMSI allocated by the SGSN 18 to a UE having a PS connection.

Since RRC-idle UEs 2 are invisible to the SGSN 18, a UE having transitioned to the RRC-idle mode after joining the MBMS cannot be counted by the RNC 10 in the same manner as an RRC-connected UE. In order to count RRC-idle UEs 2, the RNC 10 receives an RRC-connection request message from each RRC-idle UE receiving an MBMS response request message via a combination of common logical and transport channels. The RRC-connection request message is transmitted by a UE to inform the RNC 10 of its presence using a combination of common logical and transport channels. The RRC-connection request message includes the service ID of the MBMS that the UE 2 intends to receive.

The RNC 10 adds the number of RRC-idle UEs 2 to the number of RRC-connected UEs, which is a number included in the PMM-connected UE information received from the SGSN 18, in order to determine the total number of UEs intending to receive the MBMS in each cell. The RNC 10 compares the total to a threshold. If the number of UEs 2 intending to receive the MBMS in a cell is less than the threshold, the RNC 10 establishes a p-t-p MBMS radio bearer. If the number of UEs 2 intending to receive the MBMS in a cell is greater than the threshold, the RNC 10 establishes a p-t-m MBMS radio bearer. No MBMS radio bearer is established for the cell if there is no UE 2 intending to receive the service.

After determining the appropriate MBMS radio bearer, the RNC 10 informs the UEs 2 accordingly. If a p-t-p MBMS radio bearer is established for a specific MBMS, each UE 2 intending to receive the service transitions to the RRC-connected mode. On the other hand, if a p-t-m MBMS radio bearer is established, it is unnecessary for all the UEs 2 to remain in the RRC-connected mode since MBMS data reception by RRC-idle UEs is enabled when a p-t-m radio bearer is established.

The RNC 10 informs the SGSN 18 of the established MBMS radio bearer. In transmitting MBMS data via the established MBMS radio bearer, the SGSN 18 first transmits the session start message, followed after a time interval by the MBMS data. The time interval is sufficient for the RNC 10, in response to the session start message, to send an MBMS notification to the UEs 2, to count the UEs, and to determine the MBMS radio bearer.

In performing the MBMS counting function to determine the appropriate MBMS radio bearer, an RNC 10 adopting the conventional method receives information regarding RRC-connected UEs. The number of RRC-idle UEs 2 is determined by the number of UEs that respond to an MBMS response request message with an RRC-connection request message.

However, not all RRC-idle UEs 2 in a cell intending to receive the MBMS need to transmit an RRC-connection request message. The conventional method cannot determine the number of UEs 2 in the RRC-connected mode and PMM-idle mode.

If a CS connection is established, for example for carrying out a voice communication function, by an MBMS-joined UE 2 having transitioned to the RRC-idle mode to stand by for MBMS notification, an RRC connection exists but without a PS connection. In the conventional method, the RRC-connected but PMM-idle UE 2 is omitted from the RNC's 10 count since the SGSN 18 is unable to inform the RNC of the UE's presence.

An incorrect count of UEs 2 may be a serious problem if there are very few RRC-idle UEs among those joining an MBMS in a cell. A particular problem may occur if the number of RRC-idle UEs 2 is below the threshold for triggering a p-t-m radio bearer.

For example, if only one among a relatively large number of UEs 2 joining a specific MBMS within a cell stands by for MBMS notification in the RRC-idle mode and all others enter the RRC-connected mode to establish a CS connection, the RNC 10 is unable to recognize the majority of UEs since they are in the RRC-connected and PMM-idle mode. Since the RNC 10 counts only one UE 2 intending to receive the MBMS with the conventional method, a p-t-p radio bearer is established. A p-t-p radio bearer is an insufficient resource for the majority of the UEs 2 in the cell to receive the MBMS. In an extreme case, when every UE 2 of a cell is in the RRC-connected and PMM-idle mode, the RNC 10 would stop MBMS data transfer altogether since no UEs 2 intending to receive the MBMS would be counted using the conventional method.

Therefore, there is a need for a method and apparatus for accurately counting the number of mobile terminals in a cell that need to establish an RRC-connection to receive a specific service in order to properly determine the appropriate radio bearer needed. The present invention addresses these and other needs.

SUMMARY OF THE INVENTION

The present invention is directed to a method and apparatus for selecting a radio bearer type for providing a service to a plurality of mobile terminals according to a count of mobile terminals obtained through responses to a service response request message from a network. Specifically, the invention is directed to a method and apparatus that facilitates selecting an MBMS radio bearer type according to a count that includes RRC-connected mobile terminals that still need to establish a connection in order to receive the service such that the radio bearer type established is sufficient to provide the service to all mobile terminals desiring to receive the service.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method and apparatus that provides information to a network to facilitate determination of the appropriate radio bearer type to provide a service to a plurality of mobile terminals by counting those mobile terminals that either have no existing connection with the network or have an existing connection with the network that is not sufficient to receive a desired service, while excluding from the count those mobile terminals that have an existing connection with the network that is sufficient to receive the service. Specifically, mobile terminals that are either in the RRC-idle state or in the RRC-connected state but the PMM-idle state provide a response to a response request message from a network that facilitates an accurate count of those mobile terminals desiring to receive a point-to-multipoint service in a mobile communication system.

In one aspect of the present invention, a method is provided for receiving a service in a mobile terminal. The method includes receiving a response request message associated with the service from a network and transmitting to the network either a connection request message or a notification response message. A connection request message is transmitted if no connection for exchanging control data with the network already exists. A notification response message is transmitted if a connection for exchanging control data with the network already exists. The network counts the number of connection request messages and notification response messages received to determine the appropriate radio bearer to establish.

When determining whether to transmit a connection request message or a notification response message, a mobile terminal is considered to be in an RRC-idle state if no connection for exchanging control data with the network exists and considered to be in an RRC-connected state if a connection for exchanging control data with the network already exists, regardless of whether the connection is sufficient to receive the service. Therefore, mobile terminals desiring to receive the service that have no existing connection with the network will transmit a connection request message while mobile terminals desiring to receive the service that have an existing connection with the network will transmit a notification response message. Since all mobile terminals desiring to receive the service will provide a response, an accurate count of mobile terminals is facilitated.

It is contemplated that the service may be a point-to-multipoint service. Preferably, the mobile terminal has joined the service in a mobile telecommunication system.

It is contemplated that the response request message is received via a combination of common logical and common transport channels, a combination of dedicated logical and common transport channels, or a combination of dedicated logical and dedicated transport channels. It is further contemplated that the combination of channels is based on an operational state of the mobile terminal.

Preferably, the response request message is received via a combination of common logical and common transport channels when the mobile terminal is in the CELL_PCH state or the URA_PCH state. Preferably, the response request message is received via a combination of common logical and common transport channels or a combination of dedicated logical and common transport channels when the mobile terminal is in the CELL_FACH state. Preferably, the response request message is received a combination of common logical and common transport channels, a combination of dedicated logical and common transport channels, or a combination of dedicated logical and dedicated transport channels when the mobile terminal is in the CELL_DCH state.

It is contemplated that the notification response message is transmitted via a combination of common logical and common transport channels, a combination of dedicated logical and common transport channels, or a combination of dedicated logical and dedicated transport channels. It is further contemplated that the combination of channels is based on an operational state of the mobile terminal.

Preferably, the notification response message is transmitted via a combination of common logical and common transport channels when the mobile terminal is in the CELL_PCH state or the URA_PCH state. Preferably, the notification response message is transmitted via a combination of common logical and common transport channels or a combination of dedicated logical and common transport channels when the mobile terminal is in the CELL_FACH state. Preferably, the notification response message is transmitted via a combination of common logical and common transport channels, a combination of dedicated logical and common transport channels, or a combination of dedicated logical and dedicated transport channels when the mobile terminal is in the CELL_DCH state.

In one embodiment of the invention, a notification response message is transmitted only if a connection for exchanging control data with the network already exists and no connection for exchanging packet-switched control data with the network exists. If a connection for exchanging packet-switched control data with the network already exists, no message is transmitted.

Therefore, only those mobile terminals having no network connection and those mobile terminals having a network connection but no network connection for exchanging packet-switched control data will respond. The network counts the number of connection request messages and notification response messages received and utilizes additional information regarding the number of mobile terminals having an existing network connection that is sufficient to receive the service to determine the appropriate radio bearer to establish.

In another aspect of the present invention, a method is provided for receiving a multimedia service in a mobile terminal that has joined the service in a telecommunication system. The method includes receiving a response request message from a network and transmitting a notification response message to the network if a connection for exchanging control data with the network already exists and it is desired to receive the service. The network utilizes the notification response message when determining which radio bearer to set.

When determining whether to transmit a notification response message, a mobile terminal is considered to be in an RRC-idle state if no connection for exchanging control data with the network exists and considered to be in an RRC-connected state if a connection for exchanging control data with the network already exists, regardless of whether the connection is sufficient to receive packet-switched control data. Therefore, mobile terminals desiring to receive the service that have an existing connection to the network will transmit a notification response message. Preferably, the mobile terminal has joined the service in a mobile telecommunication system.

In another aspect of the present invention, a method is provided for providing a service to a plurality of mobile terminals having joined the service in a mobile telecommunication system. The method includes transmitting a response request message to at least one terminal, receiving a least one connection request message or notification response message from a mobile terminal, comparing the sum of the number of connection request messages received and the number of notification response messages received to a predetermined threshold value, and determining a type of radio bearer according to the comparison.

A connection request message is received from a mobile terminal not yet having a connection for exchanging control data with a core network. A notification response message is received from a mobile terminal already having a connection for exchanging control data with a core network. It is contemplated that the service may be a point-to-multipoint service.

Preferably, a point-to-point radio bearer is determined if the sum of the number of connection request messages received and the number of notification response messages received is less than the threshold value. Preferably, a point-to-multipoint radio bearer is determined if the sum of the number of connection request messages received and the number of notification response messages received is greater than or equal to the threshold value.

It is contemplated that a response request message is transmitted to each mobile terminal having no connection for exchanging control data with a core network via a combination of common logical and common transport channels. It is further contemplated that a response request message is transmitted to each mobile terminal having a connection for exchanging control data with a core network via one of a combination common logical and common transport channels, a combination of dedicated logical and common transport channels, and a combination of dedicated logical and dedicated transport channels. Moreover, it is contemplated that the combination of channels is based on an operational state of the mobile terminal to which the response request message is transmitted.

Preferably, the response request message is transmitted via a combination of common logical and common transport channels when the mobile terminal is in the CELL_PCH state or the URA_PCH state. Preferably, the response request message is transmitted via a combination of common logical and common transport channels or a combination of dedicated logical and common transport channels when the mobile terminal is in the CELL_FACH state. Preferably, the response request message is transmitted via a combination of common logical and common transport channels, a combination of dedicated logical and common transport channels, or a combination of dedicated logical and dedicated transport channels when the mobile terminal is in the CELL_DCH state.

In another aspect of the present invention, a method is provided for providing a service to a plurality of mobile terminals having joined the service in a mobile telecommunication system. The method includes receiving an indication from a core network of the number of mobile terminals having connections for exchanging packet-switched control data with the core network, transmitting a response request message to at least one terminal, receiving at least one connection request message or notification response message from a mobile terminal, comparing the sum of the number of mobile terminals having connections for exchanging packet-switched control data with the core network, the number of connection request messages received and the number of notification response messages received to a predetermined threshold value, and determining a type of radio bearer according to the comparison.

A connection request message is received from a mobile terminal not having a connection for exchanging control data with a core network. A notification response message is received from a mobile terminal having a connection for exchanging control data with a core network but no connection for exchanging packet-switched control data. No response is received from a mobile terminal having a connection for exchanging packet-switched control data with a core network. Preferably, the service is a point-to-multipoint service.

Preferably, a point-to-point radio bearer is determined if the sum of the number of mobile terminals having connections for exchanging packet-switched control data with the core network, the number of connection request messages received and the number of notification response messages received is less than the threshold value. Preferably, a point-to-multipoint radio bearer is determined if the sum of the number of mobile terminals having connections for exchanging packet-switched control data with the core network, the number of connection request messages received and the number of notification response messages received is greater than or equal to the threshold value.

In another aspect of the present invention, a mobile communication device is provided for receiving a service from a network. The mobile communication device includes an RF module, an antenna, a keypad, a display, a storage unit, and a processing unit.

The antenna and RF module receive a response request from the network and transmits a connection response to the network. The keypad allows a user to enter information. The display conveys information to a user. The storage unit stores a connection status for exchanging control data with the network. The processing unit performs the methods of the present invention to process the response request received from the network and generates the connection response based on the connection status.

The connection response includes a connection request message if the connection status indicates no connection for exchanging control data with the network exists. In one embodiment, the connection response includes a notification response message if the connection status indicates a connection for exchanging control data with the network already exists. In another embodiment, the connection response includes a notification response message only if the connection status indicates a connection for exchanging control data with the network already exists and no connection for exchanging packet-switched control data with the network exists and no connection response is transmitted if the connection status indicates a connection for exchanging packet-switched control data with the network already exists.

In another aspect of the present invention, a network is provided for providing a service to a plurality of mobile terminals having joined the service in a mobile telecommunication system. The network includes a transmitter, a receiver and a controller.

The transmitter transmits a response request message to at least one mobile terminal. The receiver receives at least one connection request message or notification response message from a mobile terminal.

In one embodiment, the controller performs the methods of the present invention to compare the sum of the number of connection request messages received and the number of notification response messages received to a predetermined threshold value in order to determine a type of radio bearer according to the comparison. In another embodiment, the controller performs the methods of the present invention to receive an indication from a core network of the number of mobile terminals having connections for exchanging packet-switched control data with the core network and compare the sum of the number of mobile terminals having connections for exchanging packet-switched control data with the core network, the number of connection request messages received and the number of notification response messages received to a predetermined threshold value in order to determine a type of radio bearer according to the comparison.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

The present invention relates to a method and apparatus for selecting a radio bearer type for providing a service to a plurality of mobile terminals according to a count of mobile terminals obtained through responses to a service response request message from a network, the count including network-connected mobile terminals that still need to establish a connection in order to receive the service. Although the present invention is illustrated with respect to a mobile terminal, it is contemplated that the present invention may be utilized anytime it is desired to select a radio bearer type for providing a service to a plurality of mobile communication devices by performing a counting operation that includes those devices that have an existing connection to a network.

Reference will now be made in detail to the preferred embodiments of the present invention, examples of which are illustrated in the accompanying drawings. Throughout the drawings, like elements are indicated using the same or similar reference designations.

Upon receiving a "session start" message from a core network 4 for a specific service, for example an MBMS, an RNC 10 transmits a service notification, for example an MBMS notification, to mobile terminals 2, for example UEs, in a cell desiring to receive the service. According to the present invention, an MBMS response request message is transmitted together with the MBMS notification and includes a service ID enabling the receiving UE 2 to ascertain to which MBMS the response request message corresponds.

The MBMS response request message is transmitted to UEs 2 in the RRC-connected mode as well as to those in the RRC-idle mode. A combination of common logical and transport channels is used to transmit the MBMS response request message to RRC-idle UEs 2. Additionally, a combination of dedicated logical and common transport channels and dedicated logical and dedicated transport channels is used to transmit the MBMS response request message to RRC-connected UEs 2. The transmission of the MBMS response request message to the RRC-connected UEs 2 may use the same common logical and transport channels used for transmission to the RRC-idle UEs or may use another combination of these channels.

The combination of channels is based on an operational state of the UE 2 to which the transmission is made and the available channel differs according to the operational state. The possible logical channels include control channels BCCH, PCCH, CCCH, and DCCH, and traffic channels DTCH and CTCH. The possible transport channels include the common transport channels BCH, PCH, RACH, FACH, CPCH, and DSCH and the dedicated transport channel DCH.

Figure 3:
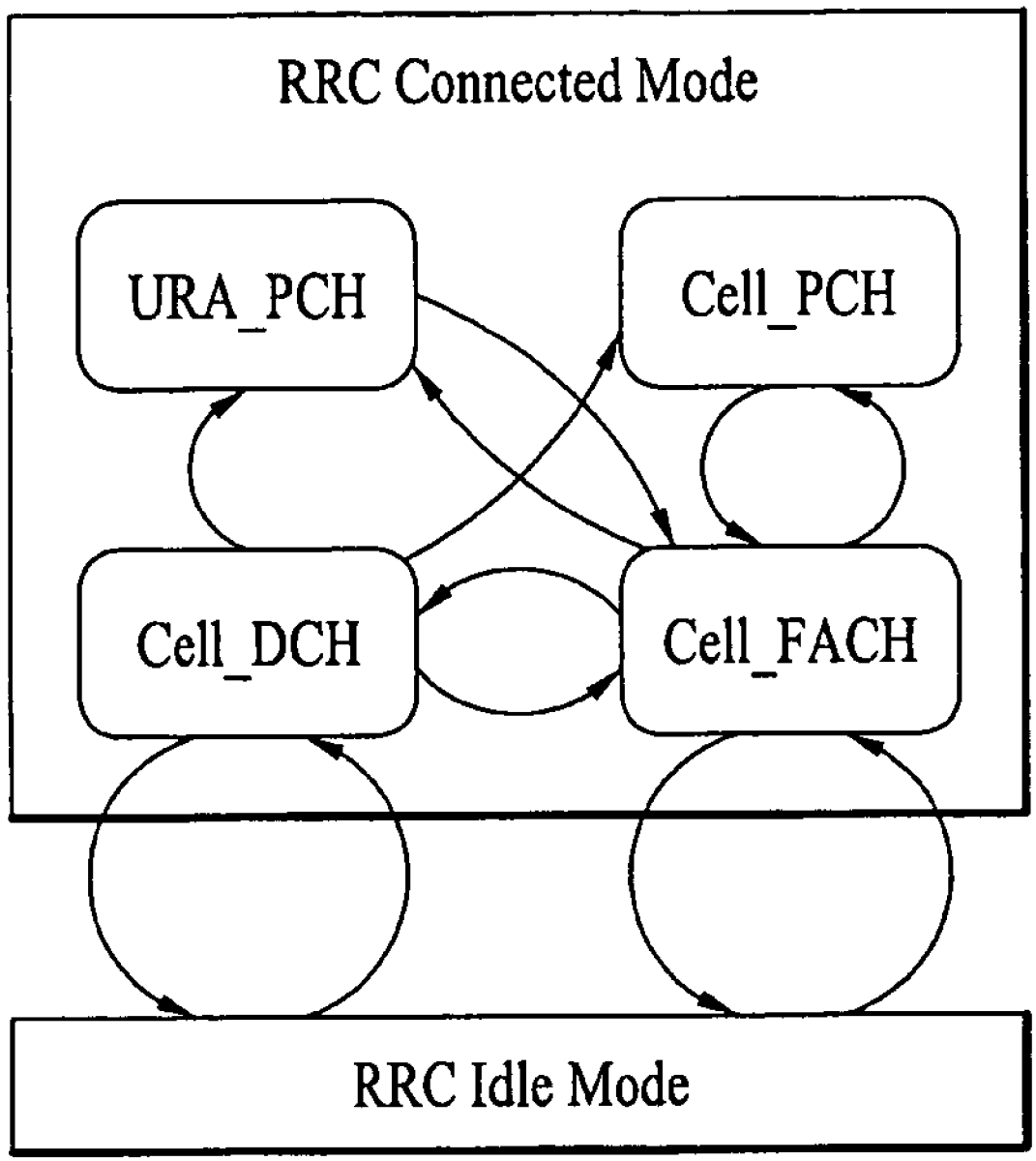
FIG. 3 illustrates a diagram of the RRC state transition of a mobile terminal.

FIG. 3 illustrates operational transitions of a UE 2, between the RRC-idle mode and the RRC-connected mode. Four operational states of a UE 2 in the RRC-connected mode are illustrated, specifically the Cell_DCH state, the Cell_FACH state, the Cell_PCH state, and the URA_PCH state. In FIG. 3, curved arrows indicate potential transitions between states.

In the Cell_DCH state, the UE 2 transmits and receives data via a dedicated transport channel, for example DCH, using dedicated logical channels, for example DCCH and DTCH, to receive high-capacity PS services and most CS services. Transition to the Cell_DCH state occurs when a UE 2 in the RRC-idle mode establishes an RRC connection or when a dedicated transport channel is allocated to a UE in the Cell_FACH state. The UE 2 receiving an MBMS in the Cell_DCH state can make a transition to the Cell_FACH state if the data volume decreases and may transition to the Cell_PCH or URA_PCH state to reduce power consumption in the event of an extended absence of data transfer. An RRC-connected UE 2 transitions to the RRC-idle mode when there is no further service to be provided.

In the Cell_FACH state, the UE 2 transmits and receives data via common transport channels, for example RACH and FACH, using dedicated logical channels, for example DCCH and DTCH, and common logical channels, for example CCCH and CTCH, to receive low-capacity PS services. Transition to the Cell_FACH state takes place if a UE 2 in the RRC-idle mode establishes an RRC connection, if an RRC-connected UE in the Cell_DCH state needs to switch to a common transport channel due to a reduction in data volume, or if a UE in the Cell_PCH or URA_PCH state needs to transmit or receive data. The UE 2 receiving an MBMS in the Cell_FACH state may make a transition to the Cell_DCH state if the data volume increases and may transition to the Cell_PCH or URA_PCH state to reduce power consumption in the event of an extended absence of data transfer.

While in the Cell_PCH or URA_PCH state, the UE 2 receives a paging channel, for example PCH, among dedicated channels while performing a discontinuous reception (DRX) function to reduce power consumption, whereby a logical channel, for example PCCH, among common logical channels is receivable. These states are mainly used for the bursty data of a PS service.

The same basic operation of standing by to receive the paging channel, for example PCH, is applicable to both the Cell_PCH and URA_PCH states. The Cell_PCH and URA_PCH states differ from each other, however, in terms of their update cycles.

A UE 2 in the Cell_PCH state keeps looking for a better cell. Particularly applicable when the UE 2 is traveling at high speed, the UE performs a cell update by UTRAN registration areas (URAs). URAs are area units much larger than one cell. Transition to the Cell_PCH or URA_PCH state occurs if data transfer of a Cell_FACH or Cell_DCH UE 2 is temporarily interrupted. When data transfer restarts, the UE 2 makes a transition to the Cell_FACH or Cell_DCH state according to data volume.

According to the channel combinations illustrated in FIG. 3, the MBMS response request message from the RNC 10 may be received by an RRC-connected mode UE 2 regardless of its operational state. Preferably, the transmission of the MBMS response request message uses a combination of common logical or transport channels for UEs 10 in the Cell_PCH or URA_PCH state. Preferably, the transmission of the MBMS response request message uses a combination of common logical or transport channels or a combination of dedicated logical channels or common transport channels for UEs 2 in the Cell_FACH state. Preferably, the transmission of the MBMS response request message uses a combination of common logical or transport channels, a combination of dedicated logical channels or common transport channels, or a combination of dedicated logical channels or dedicated transport channels for UEs 2 in the Cell_DCH state. If two or more such channel combinations are possible, as in the case of the Cell_FACH or Cell_DCH state, the MBMS response request message to an RRC-connected UE 2 may be transmitted via the same channel combinations.

According to the present invention, an RRC-connected UE 2, having joined an MBMS, receives an MBMS response request message from the RNC 10 and responds by transmitting a notification response message to the RNC. The notification response can be selectively transmitted.

For example, the UE 2 may check to determine whether the MBMS is receivable and transmit a notification response message accordingly. On the other hand, the user may arbitrarily determine whether a notification response message is transmitted and whether the notification response message is transmitted immediately or after the RNC 10 determines the radio bearer type, in which case the notification response message would be transmitted only in the event of a point-to-point radio bearer.

The notification response message includes MBMS ID information enabling the RNC 10 to ascertain to which MBMS the notification response message corresponds and includes RNC ID information enabling the RNC to ascertain which UE 2 transmitted the notification response message. The RNC 10 allocates RNC ID information for RRC-connected UEs 2 only. The RNC ID information, which enables the RNC 10 to identify each UE 2, is based on a UE's radio network temporary identifier (RNTI) and uses the cell RNTI to identify the UE by cell or the UTRAN RNTI to identify the UE by RNC.

A UE 2 in RRC-connected mode transmits the notification response message-using channel combinations determined according to its operational state. Preferably, the notification response message is transmitted using a combination of common logical and transport channels for UEs 2 in the Cell_PCH or URA_PCH state. Preferably, the notification response message is transmitted using a combination of common logical and transport channels or a combination of dedicated logical channels and common transport channels for UEs 2 in the Cell_FACH state. Preferably, the notification response message is transmitted using a combination of common logical and transport channels, a combination of dedicated logical channels and common transport channels, or a combination of dedicated logical channels and dedicated transport channels for UEs 2 in the Cell_DCH state. If two or more such channel combinations are possible, as in the case of the Cell_FACH or Cell_DCH state, the notification response message from an RRC-connected UE 2 may be transmitted via the same channel combinations.

For each session of a specific MBMS, the RNC 10 adds the number of notification response messages received from RRC-connected UEs 2 to the number of RRC connection request messages received from RRC-idle UEs and utilizes the total and a threshold to establish an MBMS radio bearer.

Figure 4:
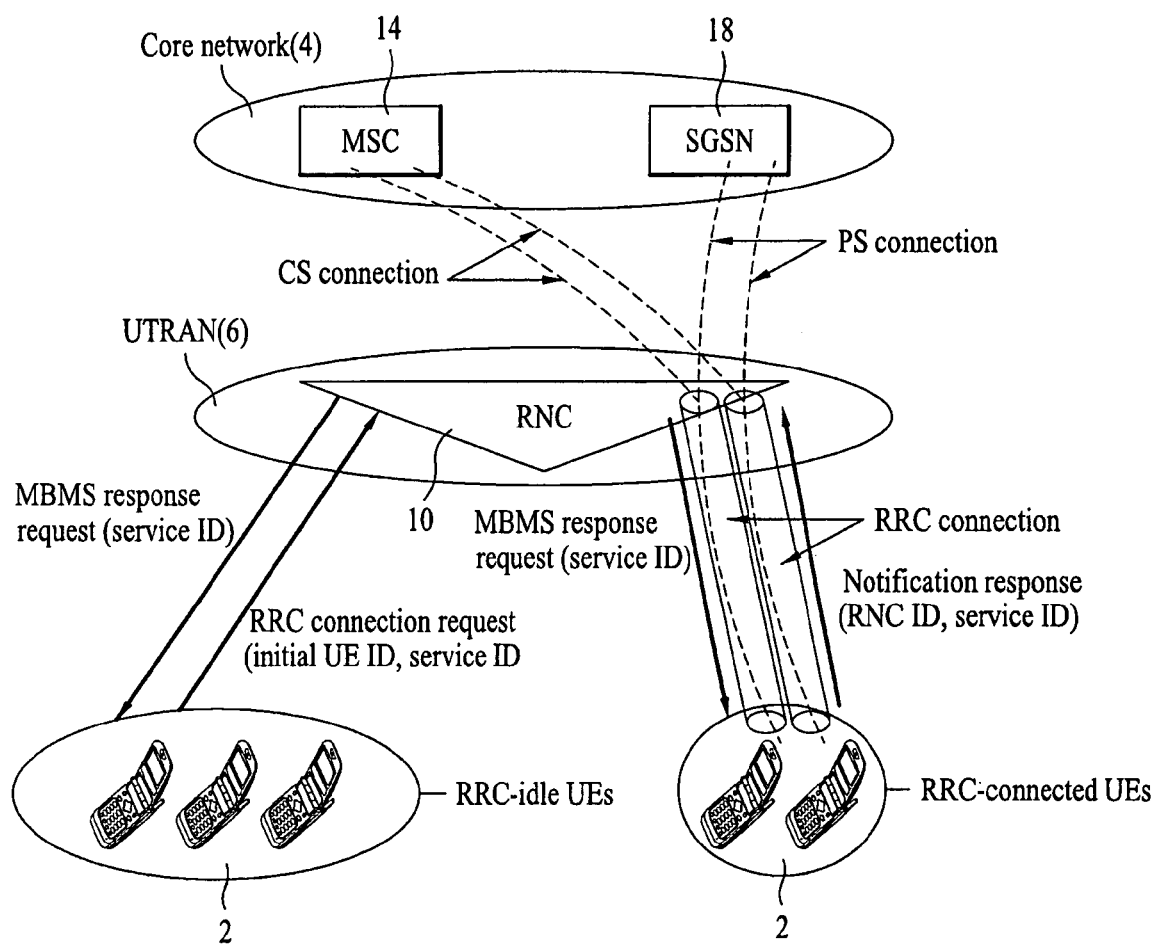
FIG. 4 illustrates a diagram of a connection of a plurality of UEs to a core network providing an MBMS according to a first embodiment of the present invention.

FIG. 4 illustrates a connection of a plurality of UEs 2 to a core network 4 providing an MBMS according to a first embodiment of the invention. The RNC 10 counts RRC-connected UEs 2 joining the MBMS. As indicated by the dotted lines in FIG. 4, a UE 2 in the RRC-connected mode may have a connection between either the MSC 14 and/or the SGSN 18 or neither one. If the UE 2 transmits a notification response message using a combination of dedicated logical channels and dedicated transport channels, the RNC ID can be omitted since the RNC 10 may identify the UE from which the message is transmitted.

The method of the first embodiment illustrated in FIG. 4 counts UEs 2 in the RRC-connected mode for a specific MBMS according to notification response messages received regardless of whether the RRC-connected UEs also have a connection with the SGSN 18, that is regardless of whether the UEs are PMM-connected or PMM-idle. Since the RNC 10 counts the number of UEs 2 having a PS connection, or those that are PMM-connected, among a plurality of RRC-connected UEs, radio resources may be wasted by unnecessary transmissions of the MBMS response request and notification response messages. To conserve radio resources, the method illustrated in FIG. 5 is proposed.

Figure 1:
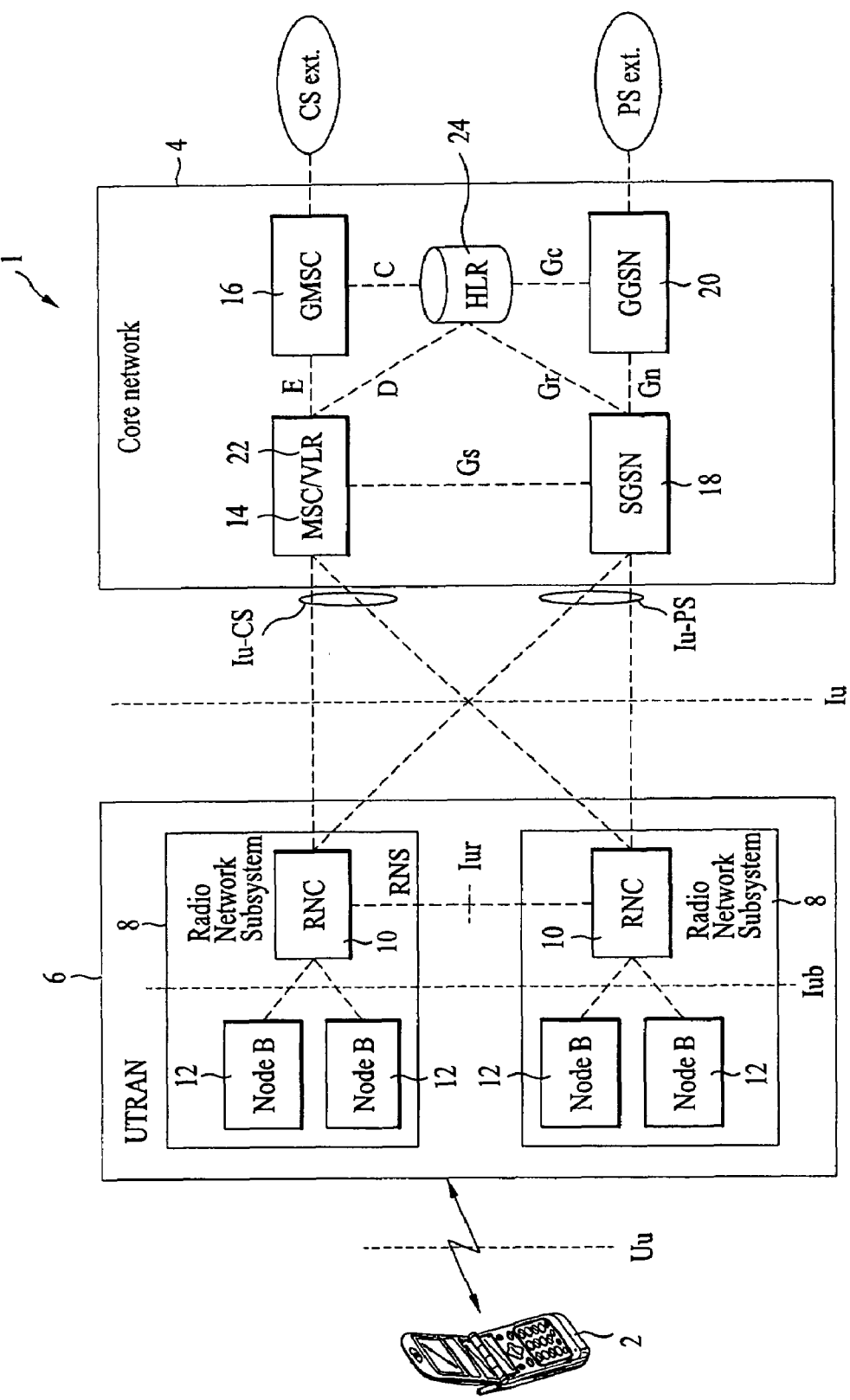
FIG. 1 illustrates a block diagram of a conventional UMTS network structure.
Figure 2:
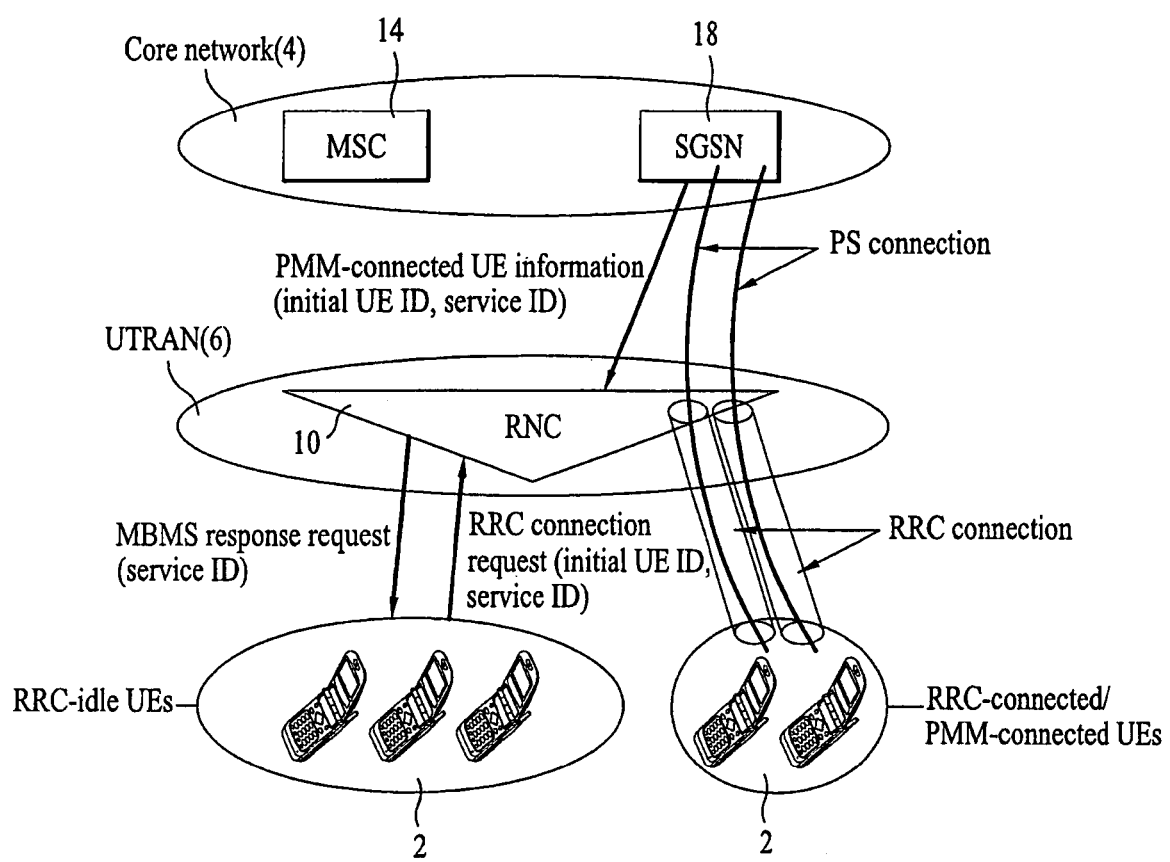
FIG. 2 illustrates a diagram of a connection of a plurality of UEs to a core network providing an MBMS according to a conventional method.
Figure 5:
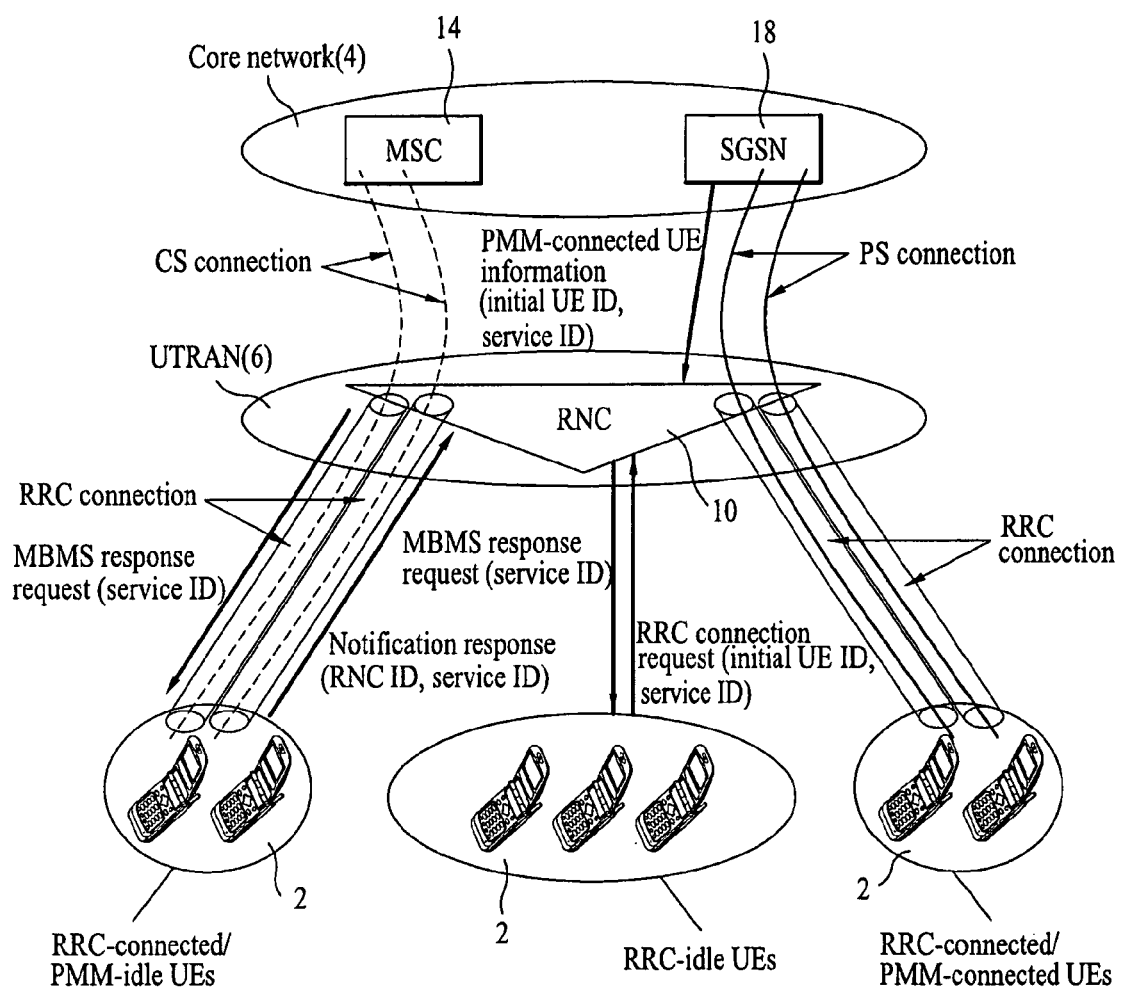
FIG. 5 illustrates a diagram of a connection of a plurality of UEs to a core network providing an MBMS according to a second embodiment of the present invention.

FIG. 5 illustrates a connection of a plurality of UEs 2 to a core network 4 providing an MBMS according to a second embodiment of the invention. The RNC 10 utilizes a method similar to that illustrated in FIG. 2 to count the number of UEs 2 in either the RRC-idle mode or both the RRC-connected and PMM-connected mode. The RNC 10 utilizes a method similar to that illustrated in FIG. 4 to count the number of UEs 2 in the RRC-connected and PMM-idle mode.

The number of RRC connection request messages received determines the number of RRC-idle UEs 2. The number of UEs 2 in both the RRC-connected mode and PMM-connected mode is determined from information received from the SGSN 18. An MBMS response request message and notification response messages are utilized to count the number of UEs in the RRC-connected and PMM-idle mode.

As indicated by the dotted lines in FIG. 5, a UE2 in the RRC-connected and PMM-idle mode may or may not have a CS connection. The second embodiment of the invention differs from the first embodiment of the invention in that UEs 2 in the RRC-connected mode, having received the MBMS response request message, transmits a notification response message only if the UE is also in the PMM-idle mode. By preventing a UE in both the RRC-connected and PMM-connected mode from unnecessarily transmitting a notification response message, radio resources may be conserved.

Figure 6:
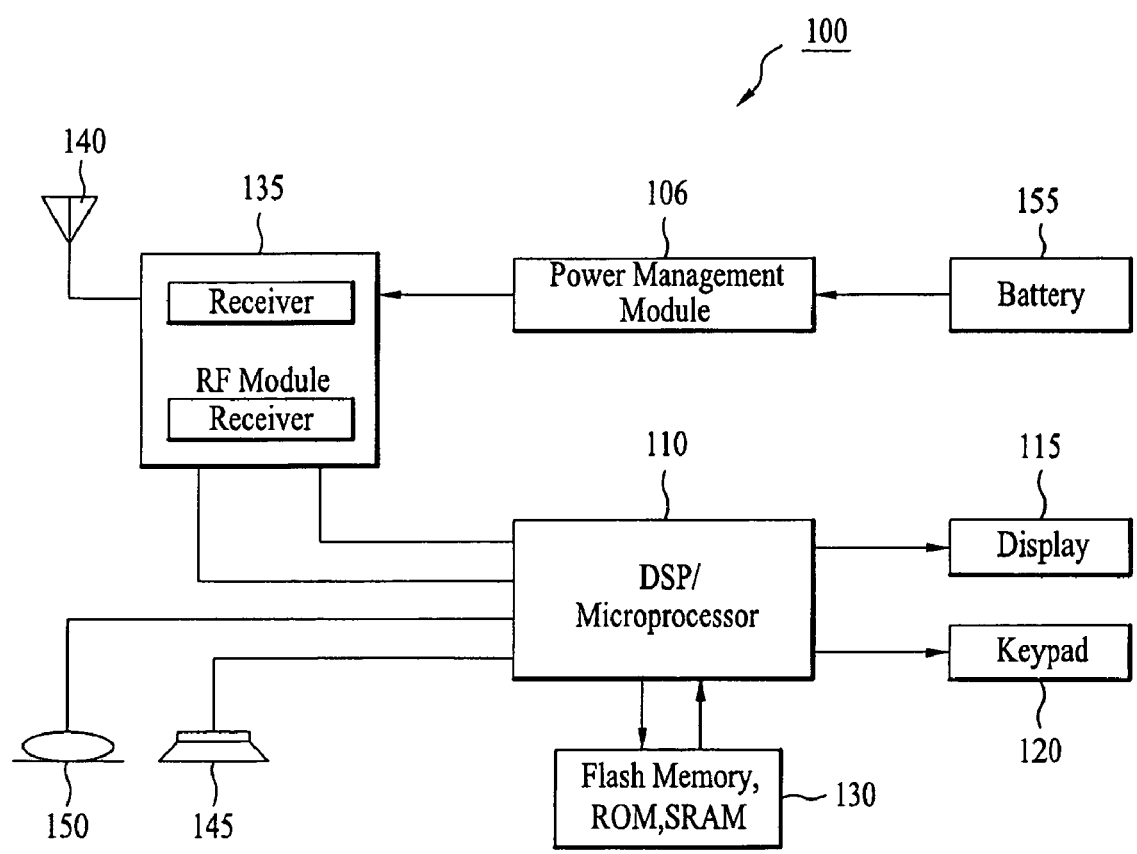
FIG. 6 illustrates a mobile communication device for receiving a service from a network according to one embodiment of the present invention.

Referring to FIG. 6, a block diagram of a mobile communication device 100 of the present invention is illustrated, for example a mobile phone for performing the methods of the present invention. The mobile communication device 100 includes a processing unit 110 such as a microprocessor or digital signal processor, an RF module 135, a power management module 105, an antenna 140, a battery 155, a display 115, a keypad 120, a storage unit 130 such as flash memory, ROM or SRAM, a speaker 145 and a microphone 150.

A user enters instructional information, such as a telephone number, for example, by pushing the buttons of the keypad 120 or by voice activation using the microphone 150. The processing unit 110 receives and processes the instructional information to perform the appropriate function, such as to dial the telephone number. Operational data may be retrieved from the memory unit 130 to perform the function. Furthermore, the processing unit 110 may display the instructional and operational information on the display 115 for the user's reference and convenience.

The processing unit 110 issues instructional information to the RF module 135, to initiate communication, for example, by transmitting radio signals comprising voice communication data. The RF module 135 includes a receiver and a transmitter to receive and transmit radio signals. The antenna 140 facilitates the transmission and reception of radio signals. Upon receiving radio signals, the RF module 135 may forward and convert the signals to baseband frequency for processing by the processing unit 110. The processed signals may be transformed into audible or readable information output, for example, via the speaker 145.

The RF module 135 is adapted to receive a response request from a network 4 and to transmit a connection response to the network and the storage unit 130 is adapted to store a connection status for exchanging control data with the network. In one embodiment, the processing unit 110 is adapted to process the response request and generate the connection response based on the connection status such the connection response includes a connection request message if the connection status indicates that the mobile terminal has no connection for exchanging control data with the network and the connection response includes a notification response message if the connection status indicates that the mobile terminal has a connection for exchanging control data with the network. In another embodiment, the processing unit 110 is adapted to generate a connection response including a notification response message only if the connection status indicates that the mobile terminal has a connection for exchanging control data with the network and has no connection for exchanging packet-switched control data with the network and to generate no connection response if the connection status indicates the mobile terminal has a connection for exchanging packet-switched control data with the network.

Figure 7:
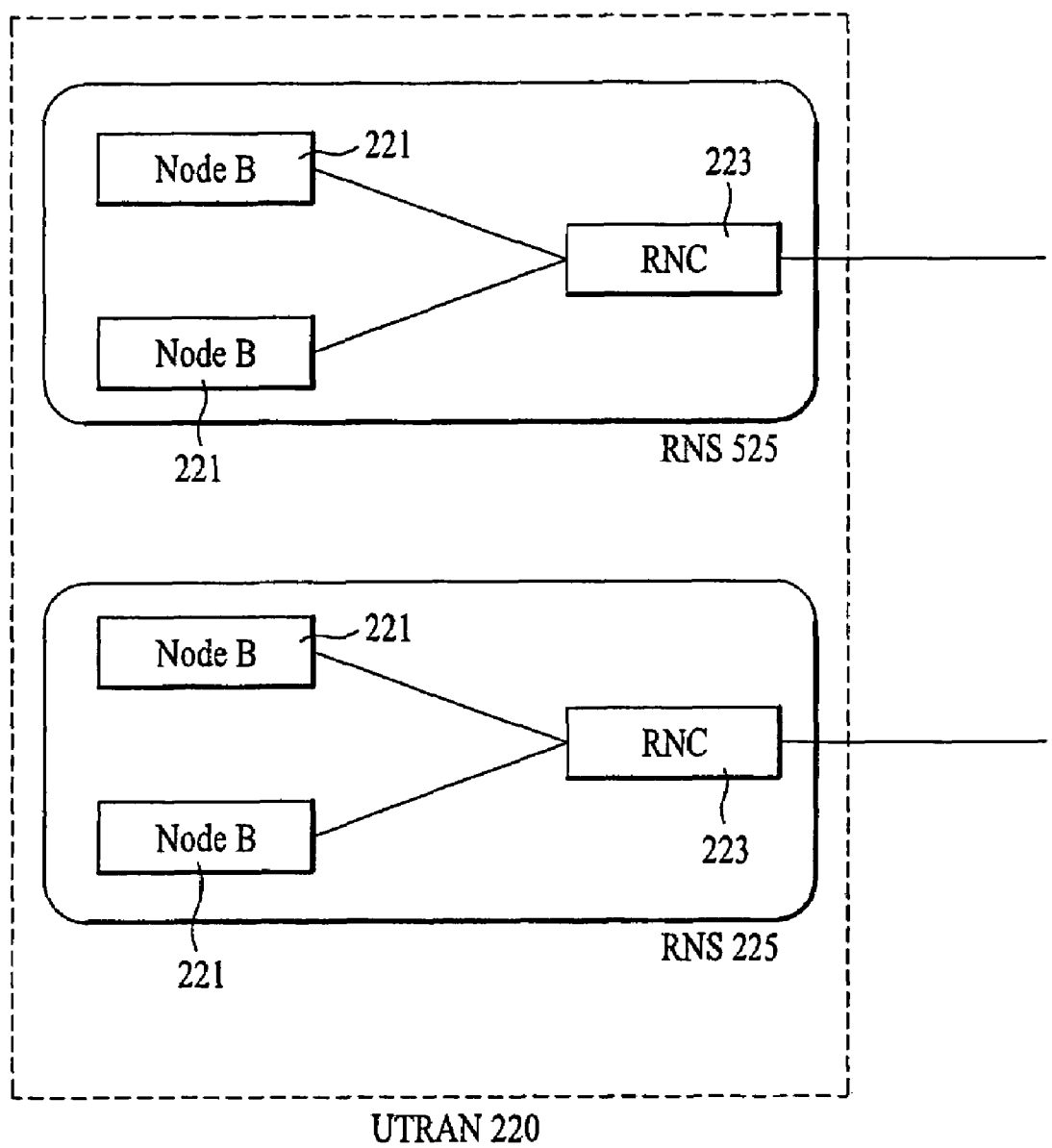
FIG. 7 illustrates a network for transmitting a service to a mobile terminal according to one embodiment of the present invention.

FIG. 7 illustrates a block diagram of a UTRAN 220 according to one embodiment of the present invention. The UTRAN 220 includes one or more radio network sub-systems (RNS) 225. Each RNS 225 includes a radio network controller (RNC) 223 and a plurality of Node-Bs 221, or base stations, managed by the RNC. The RNC 223 handles the assignment and management of radio resources and operates as an access point with respect to the core network 4. Furthermore, the RNC 223 is adapted to perform the methods of the present invention.

The Node-Bs 221 receive information sent by the physical layer of the terminal 110 through an uplink and transmit data to the terminal through a downlink. The Node-Bs 221 operate as access points, or as a transmitter and receiver, of the UTRAN 220 for a mobile terminal 100.

The Node-Bs 221 are adapted to transmit a response request message to at least one mobile terminal 100 and to receive at least one connection request message or notification response message from at least one mobile terminal. In one embodiment, the RNC 223 is adapted to compare the sum of the number of connection request messages received and the number of notification response messages received to a predetermined threshold value in order to determine a type of radio bearer according to the comparison. In another embodiment, the RNC 223 is adapted to receive an indication from a core network 4 of the number of mobile terminals 100 having connections for exchanging packet-switched control data with the core network and compare the sum of the number of mobile terminals having connections for exchanging packet-switched control data with the core network, the number of connection request messages received and the number of notification response messages received to a predetermined threshold value to determine a type of radio bearer according to the comparison.

An RNC and network adopting the methods of the present invention can correctly count the number of UEs for a specific MBMS to select an appropriate MBMS radio bearer, thereby enabling increased radio resource efficiency. The present invention ensures that a UE joining an MBMS can be provided the service in all situations. In particular, the methods of the present invention enable the counting of RRC-connected UEs having no PS connection, which cannot be counted by the conventional method when the UTRAN counts UEs intending to receive an MBMS.

It will be apparent to one skilled in the art that the preferred embodiments of the present invention can be readily implemented using, for example, the processor 110 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

What is claimed is:

1. A method of transmitting a message from a mobile terminal to a network for enabling the network to count the number of mobile terminals that desire to receive a point-to-multipoint service in a mobile telecommunication system, the method comprising:
   receiving a response request message from the network, the response request message associated with the point-to-multipoint service; and
   transmitting a response message if the mobile terminal is in an RRC-connected (Radio Resource Control-connected) and PMM-idle (Packet Mobility Management-idle) mode in which the mobile terminal has a connection for exchanging control data with the network but no packet switching (PS) connection with a core network.

2. A method of exchanging messages with a plurality of mobile terminals for counting the number of mobile terminals that desire to receive a point-to-multipoint service in a network of a mobile telecommunication system, the method comprising:
   transmitting a response request message to at least one of the plurality of mobile terminals;
   receiving at least one response message if the at least one of the plurality of mobile terminals is in an RRC-connected (Radio Resource Control-connected) and PMM-idle (Packet Mobility Management-idle) mode in which the at least one of the plurality of mobile terminals has a connection for exchanging control data with the network but no packet switching (PS) connection with a core network.

3. A mobile terminal for transmitting a message to a network for enabling the network to count the number of mobile terminals that desire to receive a point-to-multipoint service in a mobile telecommunication system, the mobile terminal comprising:
   an RF module configured to receive a response request message from the network, the response request message associated with the point-to-multipoint service, and to transmit a response message to the network;
   a keypad for inputting information from a user;
   a storage unit adapted to store a connection status for exchanging control data with the network;
   a display adapted to convey information to the user; and
   a processing unit adapted to process the response request received from the network and control the RF module to transmit the response message if the mobile terminal is in an RRC-connected (Radio Resource Control-connected) and PMM-idle (Packet Mobility Management-idle) mode in which the mobile terminal has a connection for exchanging control data with the network but no packet switching (PS) connection with a core network.

4. A network for exchanging messages with a plurality of mobile terminals for counting the number of mobile terminals that desire to receive a point-to-multipoint service in a network of a mobile telecommunication system, the network comprising:
   a transmitter configured to transmit a response request message to at least one of the plurality of mobile terminals;
   a receiver configured to receive at least one response message; and a controller configured to control the transmitter to transmit the response request message and process the at least one response message if the at least one of the plurality of mobile terminal is in an RRC-connected (Radio Resource Control-connected) and PMM-idle (Packet Mobility Management-idle) mode in which the at least one of the plurality of mobile terminals has a connection for exchanging control data with the network but no packet switching (PS) connection with a core network.

5. The method of claim 1, wherein the response request message is received via a combination of common logical and common transport channels, a combination of dedicated logical and common transport channels, or a combination of dedicated logical and dedicated transport channels.

6. The method of claim 5, wherein the combination of common logical and common transport channels, the combination of dedicated logical and common transport channels and the combination of dedicated logical and dedicated transport channels is based on an operational state of the mobile terminal.

7. The method of claim 6, wherein the response request message is received via the combination of common logical and common transport channels when the mobile terminal is in the CELL_PCH state.

8. The method of claim 6, wherein the response request message is received via the combination of common logical and common transport channels when the mobile terminal is in the URA_PCH state.

9. The method of claim 6, wherein the response request message is received via the combination of common logical and common transport channels or the combination of dedicated logical and common transport channels when the mobile terminal is in the CELL_FACH state.

10. The method of claim 6, wherein the response request message is received via a combination of common logical and common transport channels, a combination of dedicated logical and common transport channels, or a combination of dedicated logical and dedicated transport channels when the mobile terminal is in the CELL_DCH state.

11. The method of claim 1, wherein the response message is transmitted via a combination of common logical and common transport channels when the mobile terminal is in a CELL PCH state.

12. The method of claim 1, wherein the response message is transmitted via a combination of common logical and common transport channels when the mobile terminal is in the URA_PCH state.

13. The method of claim 1, wherein the response message is transmitted via a combination of common logical and common transport channels or a combination of dedicated logical and common transport channels when the mobile terminal is in a CELL_FACH state.

14. The method of claim 1, wherein the response message is transmitted via a combination of common logical and common transport channels, a combination of dedicated logical and common transport channels, or a combination of dedicated logical and dedicated transport channels when the mobile terminal is in the CELL_DCH state.

15. The method of claim 2, further comprising the network establishing a point-to-point type radio bearer if a number of connection request messages and the number of response messages received from the at least one of the plurality of mobile terminals is less than a threshold value.

16. The method of claim 2, further comprising the network establishing a point-to-multipoint type radio bearer if a number of connection request messages and the number of response messages received from the at least one of the plurality of mobile terminals exceeds a threshold value.

17. The method of claim 2, wherein the response request message is transmitted to each of the plurality of mobile terminals having no connection for exchanging control data with a core network via a combination of common logical and common transport channels.

18. The method of claim 2, wherein the response request message is transmitted to each of the plurality of mobile terminals having a connection for exchanging control data with a core network via a combination of common logical and common transport channels, a combination of dedicated logical and common transport channels, or a combination of dedicated logical and dedicated transport channels.

19. The method of claim 18, wherein the combination of common logical and common transport channels, the combination of dedicated logical and common transport channels and the combination of dedicated logical and dedicated transport channels is based on an operational state of the mobile terminal to which the response request message is transmitted.

20. The method of claim 19, wherein the response request message is transmitted via the combination of common logical and common transport channels when the mobile terminal is in one of the CELL_PCH state and URA_PCH state.

21. The method of claim 19, wherein the response request message is transmitted via the combination of common logical and common transport channels or the combination of dedicated logical and common transport channels when the mobile terminal is in the CELL_FACH state.

22. The method of claim 19, wherein the response request message is transmitted via a combination common logical and common transport channels, a combination of dedicated logical and common transport channels, or a combination of dedicated logical and dedicated transport channels when the mobile terminal is in the CELL_DCH state.

23. The method of claim 19, wherein the at least one response message is received via a combination of common logical and common transport channels when the mobile terminal is in a CELL_PCH state.

24. The method of claim 19, wherein the at least one response message is received via a combination of common logical and common transport channels when the mobile terminal is in the URA_PCH state.

25. The method of claim 19, wherein the at least one response message is received via a combination common logical and common transport channels, a combination of dedicated logical and common transport channels, or a combination of dedicated logical and dedicated transport channels when the mobile terminal is in the CELL_DCH state.

\* \* \* \* \*